(12) United States Patent
Peltola et al.

(10) Patent No.: US 7,481,865 B2
(45) Date of Patent: Jan. 27, 2009

(54) METHOD FOR REMOVING MERCURY FROM GAS

(75) Inventors: Heljä Peltola, Pori (FI); Pekka Taskinen, Pori (FI); Heikki Takala, Pori (FI); Jens Nyberg, Kokkola (FI); Harri Natunen, Kokkola (FI); Jorma Panula, Kokkola (FI)

(73) Assignee: Outotec Oyj, Espoo (FI)

( * ) Notice: Subject to any disclaimer, the term of this patent is extended or adjusted under 35 U.S.C. 154(b) by 0 days.

(21) Appl. No.: 10/433,844

(22) PCT Filed: Dec. 7, 2001

(86) PCT No.: PCT/FI01/01064

§ 371 (c)(1),
(2), (4) Date: Nov. 26, 2003

(87) PCT Pub. No.: WO02/45825

PCT Pub. Date: Jun. 13, 2002

(65) Prior Publication Data

US 2004/0081605 A1    Apr. 29, 2004

(30) Foreign Application Priority Data

Dec. 8, 2000    (FI) .................................. 20002698

(51) Int. Cl.
*C22B 61/00* (2006.01)
*C22B 43/00* (2006.01)
(52) U.S. Cl. .......................... 75/584; 423/101; 423/103
(58) Field of Classification Search .................. 75/742, 75/670, 584; 95/205; 423/210, 101, 103
See application file for complete search history.

(56) References Cited

U.S. PATENT DOCUMENTS

| 3,677,696 | A | * | 7/1972 | Bryk et al. | ................... 423/210 |
| 3,954,451 | A | | 5/1976 | Kinoshita | ..................... 75/108 |
| 4,057,423 | A | * | 11/1977 | Kinoshita | ..................... 75/420 |
| 4,138,231 | A | * | 2/1979 | Hedenas et al. | ............... 95/196 |
| 4,443,417 | A | * | 4/1984 | Wiklund | ...................... 423/210 |
| 4,579,726 | A | * | 4/1986 | Kuivala et al. | .............. 423/531 |
| 5,480,619 | A | * | 1/1996 | Johnson et al. | ............. 422/168 |
| 6,375,909 | B1 | * | 4/2002 | Dangtran et al. | ............. 423/235 |

FOREIGN PATENT DOCUMENTS

| CA | 934131 | 9/1973 | ................ 23/356.5 |
| SU | 889071 B | * 12/1981 | |
| WO | WO 98/06478 | * 2/1998 | |

OTHER PUBLICATIONS

English abstract of SU 889071 B.*
English translation of Soviet Union patent 889071.*

* cited by examiner

*Primary Examiner*—Roy King
*Assistant Examiner*—Tima M McGuthry-Banks
(74) *Attorney, Agent, or Firm*—Morgan & Finnegan, L.L.P.

(57) ABSTRACT

The invention relates to a method for the removal of mercury from gas containing sulphur dioxide and oxygen and from the sulphuric acid vapour contained in the gas. According to the method, the gas is washed with a water solution that contains selenium ions, whereby metallic selenium is formed in the presence of oxygen, which precipitates the mercury in the gas and vapour either as a selenide or in a chlorine-containing environment, as a dichloride of mercury and selenium. Gas washing occurs at a low temperature, below 50° C.

3 Claims, No Drawings

METHOD FOR REMOVING MERCURY FROM GAS

The present invention relates to a method for the removal of mercury from gas containing sulphur dioxide and oxygen and from the sulphuric acid vapour contained in the gas. According to the method, the gas is washed with a water solution that contains selenium ions, whereby metallic selenium is formed in the presence of oxygen, which precipitates the mercury in the gas and vapour either as a selenide or, in a chlorine-containing environment, as a double chloride of mercury and selenium. Gas washing occurs at a low temperature, below 50° C.

Sulphuric acid is usually produced from sulphur dioxide-containing gases such as those from the roasting and smelting of zinc and copper concentrates. The Hg content of gases generated in roasting is of the order of 5-500 mg/Nm$^3$. The most thorough removal of mercury from the gases is a pre-requisite for the production of high quality sulphuric acid. This means that the maximum mercury content of sulphuric acid may be of the order of 0.1 mg/kg $H_2SO_4$.

The removal of mercury from gas has been carried out in many ways, which can be divided according to their operating principle into two groups. The first includes methods based on adsorption and filtration, and the second methods based on precipitation and filtration.

Adsorption-filtration methods are applicable only to conditions where the mercury content of the gas is low i.e. typically of the order of less than 10 mg/Nm$^3$. In these methods the gas is routed through a filter and the mercury is adsorbed into the contact surfaces. Y-type zeolite impregnated with sulphur, active carbon and selenium filters have been used as adsorbents. The use of a selenium filter is described for example in U.S. Pat. No. 3,786,619, where the method is based on the reaction between gaseous mercury and solid selenium. An inert porous filter material is used in this method, onto which a solution containing selenium dioxide, $SeO_2$, is absorbed and dried. Selenium dioxide is reduced by the effect of the sulphur dioxide in the gas to be washed into elemental selenium, which further reacts with the mercury forming selenides HgSe.

Precipitation-filtration methods are used in processes where the mercury charge contained in the gas is large, $\geq 800$ mg/Nm$_3$. In these methods, mercury is precipitated as an insoluble compound and removed from the washers as a slurry, which is filtered. A filtration method is described for example in U.S. Pat. No. 3,677,696, where mercury is sulphated in concentrated wash acid at temperatures of 160-220° C. and precipitated from the circulating sulphuric acid solution. A method is known from U.S. Pat. No. 4,640,751, where the gases are washed with a chloride solution and mercury is precipitated as calomel $Hg_2Cl_2$.

CA patent 934 131 presents a method whereby gases containing mercury are cleaned using 1-67 percent by weight sulphuric acid in temperatures of 50-110° C. The washing liquid used is thus a sulphuric acid solution, saturated with active sulphur or selenium, present in solid form in suspension. In the connotation used here, the word active means that the compounds may be present in a very finely divided form, preferably in a freshly generated state. It is beneficial to add sulphur or selenium to the roasting gas before washing or also directly to the wash acid. Selenium may be added in the form of selenium dioxide for example. When this compound comes into contact with the sulphur dioxide in the roasting gas, the sulphur dioxide reduces the selenium dioxide to elemental selenium in the diluted acid in an especially active "in situ" form. Sulphur and selenium have been found to have a surprising effect in combination. This method has made it possible to reduce the mercury content in sulphuric acid to a value of 0.2 mg Hg/kg $H_2SO_4$.

A method is known from CA patent 983 671, whereby mercury is removed from a sulphuric acid solution produced from sulphur dioxide gas by adding thiosulphate to the acid and separating the mercury sulphide thus formed, for instance by flotation or filtration.

This invention relates to a method whereby mercury is removed from gas containing sulphur dioxide and oxygen and from the sulphuric acid vapour contained in the gas, using selenium. The well-known fact that the selenium ion is easily reduced to metal by sulphur dioxide is utilised in this invention. According to the invention, water, to which a solution containing selenium ions is added, is used as the wash water for oxygen-containing sulphur dioxide gas such as roaster gas. The reactions between the sulphur dioxide and oxygen contained in the gas and the selenium compound in the wash water generate metallic selenium and sulphuric acid. In addition, sulphuric acid vapour is present in the gas. In practice, it has been found that the gas coming to the acid plant from the roaster includes the majority of the mercury as dissolved in the acid vapour and only a very small fraction of it (less than 10%) is present as gaseous mercury or mercury compounds. The sulphuric acid dissolves the mercury from the gases into the wash water and the dissolving mercury reacts with the selenium particles in the wash water further to form slightly soluble Se, Hg compounds. The reaction occurs at low temperatures, below 50° C. The selenium content of the wash water is adjusted in the range 100-1000 mg/Se/l. The essential features of the invention will be made apparent in the attached claims.

The reduction of the selenium compound contained in the wash water using the roaster gas can be described by the following reaction:

$$Se^{4+} + 2SO_2(g) + O_2(g) + 2H_2O + 4e^- \longrightarrow Se° + 4H^+ + 2SO_4^{2-} \quad (1)$$

The sulphuric acid in droplet (vapour) form reacts with the selenium compound in the wash water according to the following reaction:

$$Se^{4+} + 2SO_3^{2-} + 2H_2O \longrightarrow Se° + 4H^+ + 2SO_4^{2-} \quad (2)$$

The washing of the mercury from the gas occurs with the aid of the sulphuric acid thus formed so that the mercury dissolving in the wash water further reacts to make slightly soluble Se, Hg compounds on the surface of the selenium particles. The washing stage can be presented with a complete reaction e.g. regarding elemental mercury:

$$Hg + H_2SO_4 \longrightarrow Hg^{2+} + SO_4^{2-} + 2H^+ + 2e^- \quad (3)$$

The reactions, occurring on the surface of the elemental selenium formed in the washing, depend on whether the mercury removal is performed in a chlorine-free or chlorine-containing environment. When there is a chlorine-free environment, mercury reacts on the surface of the selenium particles forming a slightly soluble mercury selenide. In a chlorine-containing environment the product is a Hg, Se double chloride. The reactions can be expressed as follows:

$$Hg^{2+} + Se + 2e^- \longrightarrow HgSe \quad (4)$$

$$3Hg^{2+} + 2Se + 2Cl^- + 4e^- \longrightarrow 2HgSe \cdot HgCl_2 \quad (5)$$

It has been noted in experiments that mercury removal works best when a high selenium content is maintained in the wash solution, such as 100-1000 mg/Se/l. The amount of selenium is adjusted so that the selenium content is saturated in all conditions in relation to the metallic selenium formed from the liquid. The regulation of the selenium content is performed with a continuous feed. In the washing stage, sulphuric acid is not added to the wash solution but instead the wash liquid required for washing is pure water and the acid needed in all the reactions is either present as acid vapour in the gas or is generated as a result of the reactions of the sulphur dioxide and selenium ions in the gas. A high level of selenium and the acid produced in reaction (2) are sufficient to produce a suitable environment for the effective removal of mercury. Thus, the method works in almost pure water, since the acid produced by the reducing reaction of the selenium creates the conditions whereby the elemental selenium remains (meta)stable for sufficiently long periods of time from the standpoint of mercury removal. In practice, it has been found possible with the present method to produce sulphuric acid on a commercial scale with a mercury content of less than 0.1 mg/kg $H_2SO_4$.

The invention claimed is:

1. A method for the removal of mercury from gas containing sulphur dioxide and oxygen and from the sulphuric acid vapour contained in the gas comprising washing the gas using pure water as the washing liquid, feeding a liquid selenium compound into the washing liquid so that the selenium content in the washing liquid is in the range of 100-1000 mg Se/l, and forming metallic selenium in the washing liquid, wherein the mercury is removed from the gas as mercury selenide HgSe or double chloride $2HgSe.HgCl_2$ at a temperature below 50° C.

2. The method according to claim 1, wherein the amount of selenium is adjusted so that the selenium content is saturated in all conditions with regard to the metallic selenium formed from the washing liquid.

3. The method according to claim 1, wherein the selenium content is regulated by using a continuous feed.

* * * * *